United States Patent

[11] 3,550,557

[72] Inventor  Frank Edward Goldsmith
            Cwmbran, England
[21] Appl. No. 736,060
[22] Filed    June 11, 1968
[45] Patented Dec. 29, 1970
[73] Assignee The De Laval Separator Company
            Poughkeepsie, N.Y.,
            a corporation of New Jersey. by mesne
            assignment
[32] Priority June 12, 1967
[33]          Great Britain
[31]          No. 27003/67

[54] TEAT CUP
    1 Claim, 3 Drawing Figs.
[52] U.S. Cl. .................................................. 119/14.36,
                                                              119/14.49
[51] Int. Cl. .................................................. A01j 05/04
[50] Field of Search .......................................... 119/14.47-
                        —14.53, 14.38; 119/14.36, 14.49

[56]            References Cited
            UNITED STATES PATENTS
807,372   12/1905  Gillies .......................... 119/14.52
1,260,466  3/1918  Sharples ....................... 119/14.49X
1,709,758  4/1929  Wallace, Jr. ................... 119/14.38
1,727,501  9/1929  Budach ......................... 119/14.38
3,255,732  6/1966  Raht ............................ 119/14.52

Primary Examiner—Hugh R. Chamblee
Attorney—Davis, Hoxie, Faithfull & Hapgood

ABSTRACT: In a teat cup having a flexible liner adapted for connection to a constant vacuum source and also having a rigid outer shell forming a pulse space around the liner, a restricted passage is provided between the pulse space and the interior of the liner; and the pulse space is alternately connected to and isolated from atmosphere without subjecting it to partial vacuum other than through the restricted passage.

PATENTED DEC29 1970

INVENTOR.
FRANK EDWARD GOLDSMITH
BY

TEAT CUP

This invention relates to a teat cup for milking machines and has particular reference to improvements in the pulsation system.

Normally, the teat cups of milking machines each comprise a rigid outer shell and a resiliently flexible tubular liner inside the shell. The liner is sealed at the top and bottom of the shell and the lower end of the liner is connected to a constant vacuum source, milk being withdrawn from the teats under the influence of the vacuum in the liner.

It is necessary to interrupt the suction on the teat and massage the teat to maintain blood circulation, and this is conventionally achieved by connecting the space between the liner and the teat cup shell (the pulse space) to atmospheric air and vacuum alternately under the control of an automatic valve usually known as a pulsator. Certain undesirable features may characterize the collapsing action, as the sudden interruption of milk flow causes an increase in vacuum; and as the liner reopens, the increase in volume can cause a back surge of milk. This is at present partially overcome by introducing an air bleed at the claw piece which interconnects the milk tubes from a cluster of teat cups.

In accordance with a feature of the present invention, some or all of these difficulties may be reduced or obviated by the provision of a milking machine in which a restricted passage is arranged between the interior of the liner and the pulse space in each teat cup, and the pulse space is alternately connected to and isolated from atmosphere without being subjected to partial vacuum other than through this restricted passage.

The invention also contemplates a teat cup in which a permanently open restricted passage is provided between the interior of the liner and the pulse space of the teat cup. The liner may be stretched between the ends of the shell in a conventional way, or the lower end of the liner may be free of the shell, the clearance between the liner and shell constituting the restricted passage.

Various forms of the invention will now be described, by way of example only, with reference to the accompanying drawings, in which.

Figure 1:
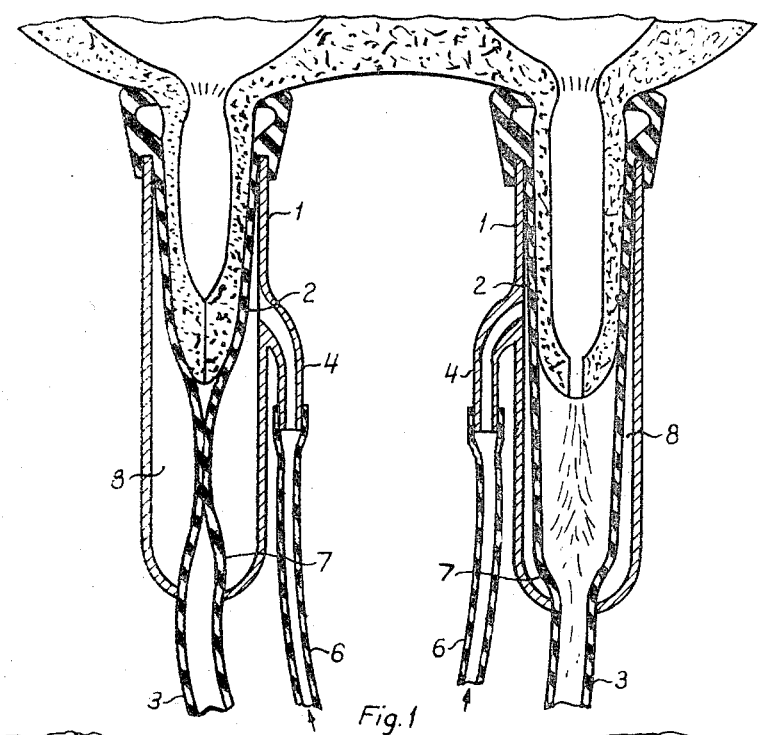
FIG. 1 is a vertical sectional view of two teat cups of a cluster, showing one embodiment of the invention.

In the arrangement shown in FIG. 1, each teat cup comprises a rigid outer shell 1 having a flexible liner 2 stretched between the ends of the shell and integral with a milk tube 3. The shell has an air nipple 4 connected by a tube 6 to a pulsator (not shown). A restricted passage in the form of an orifice 7 through the wall of the liner 2 provides communication between the interior of the liner and the pulse space 8.

In use, the interior of the liner is connected to a source of constant vacuum by the milk tube 3 and the usual milk claw (not shown). The pulsator acts as a simple valve which opens and closes at a controlled rate, alternately admitting atmospheric air to the pulse space 8 and closing off the supply of air. When air enters the pulse space from the pulsator by way of tube 6, the liner is collapsed, as shown in the left-hand part of FIG. 1, and some air passes through the orifice 7 to displace milk through the milk tube 3. When the pulsator valve closes, more air is drawn through the orifice 7 to reduce the pressure in pulse space 8, causing the liner 2 to relax (right-hand half of FIG. 1) without any back surge of milk.

Figure 2:
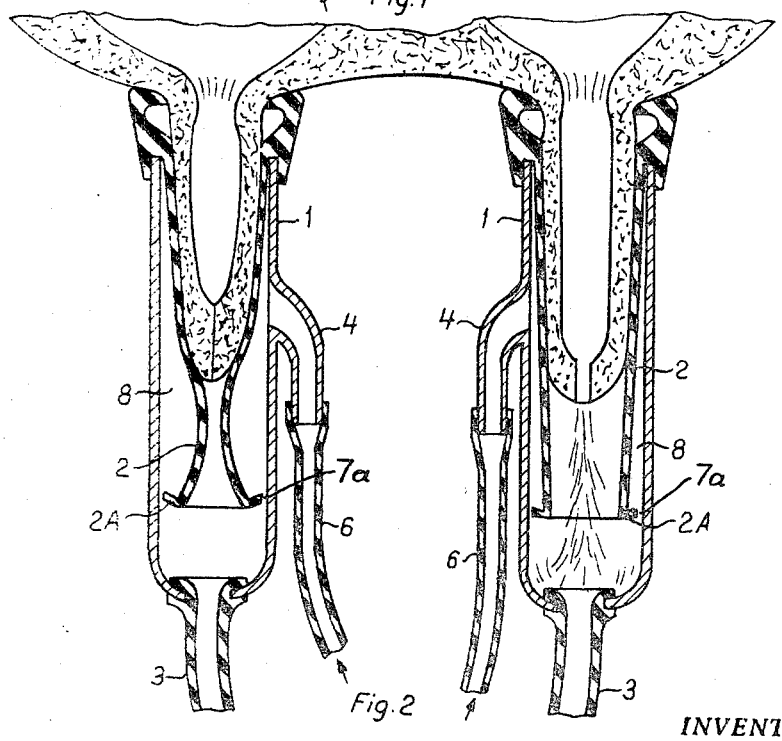
FIG. 2 is a similar view of another embodiment.

The arrangement shown in FIG. 2 operates on the same general principles as the FIG. 1 arrangement. In FIG. 2, however, the lower end of the liner 2 is free of the shell 1, being formed with a thickened rim 2A which fits closely within the shell but with a narrow annular clearance 7a constituting the restricted passage. With this construction, opening of the pulsator valve collapses the liner only partially and thus does not cause it to close off completely (left-hand part of FIG. 2). The air pressure in pulse space 8 causes some slight stretching of the liner. Closure of the pulsator acts in the above-described manner whereby air is drawn from pulse space 8 through the restricted passage 7a to displace milk and allow the liner 2 to relax (right-hand part of FIG. 2). In this case, milk is delivered into the interior of the shell 1, to which the milk tube 3 is directly connected.

Figure 3:
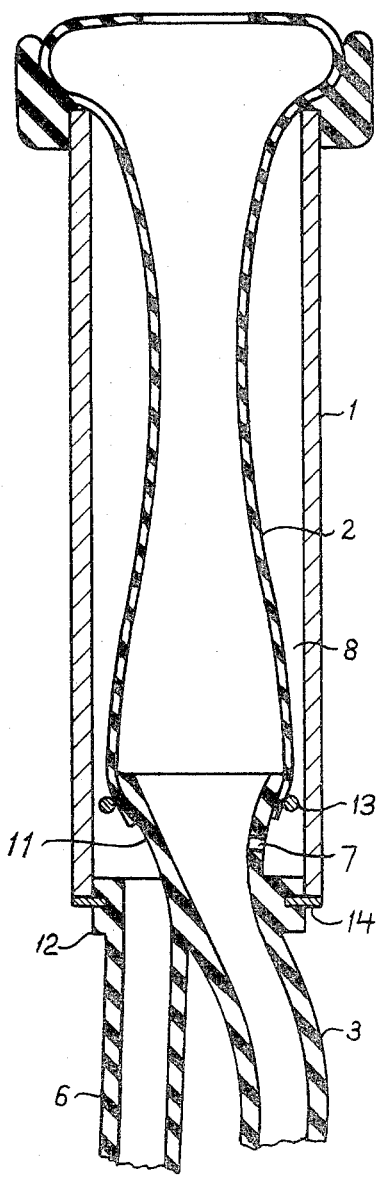
FIG. 3 is a vertical sectional view of still another embodiment of the new teat cup.

In the teat cup shown in FIG. 3, the upper end of the liner 2 is anchored to the upper end of the outer shell 1, and the lower end is releasably secured to a flared nipple 11 of a rigid moulding 12 which closes the lower end of the shell. The liner is locked to the nipple by a so-called "grab-ring" 13, whose locking action is ensured by the liner being stretched on assembly with the shell. The moulding 12 is of a diameter to pass through the shell, to facilitate assembly, and is restrained by a locking ring 14. The moulding is formed integrally with the milk tube 3 and with the tube 6 which intermittently admits air to the pulse space 8.

The restricted passage in FIG. 3 is constituted by a hole 7 through the wall of the moulding, and operation of the teat cup is the same as that of FIG. 1.

The air valve used with the above-described teat cups can take many constructional forms but is preferably in the form of a conventional vacuum pulsator modified simply by closing off its vacuum channel, whereby tube 6 alternately supplies air to the space 8 and cuts off the supply. Standard vacuum pulsators are readily available and operate reliably to give a suitable number of reversals per unit of time, but special purpose valves could, of course, be used if desired.

It will be understood that through the parts 4 in FIGS. 1 and 2 and the part 12 in FIG. 3, each teat cup is provided with an air inlet to its pulse space 8, whereby the latter can be intermittently supplied with air through this inlet and is subjected to partial vacuum only by way of the restricted passage 7 or 7a and the milk tube 3.

We claim:

1. A teat cup for a vacuum milking machine, which comprises a rigid outer shell and a flexible liner located within the shell to form a pulse space between the shell and liner, there being a restricted passage through which the interior of the liner communicates with said pulse space, the liner being adapted for connection of its interior to a vacuum source and the teat cup having an air inlet to said pulse space, whereby the pulse space can be intermittently supplied with air through said inlet and subjected to partial vacuum only through said restricted passage, the upper end of the liner being anchored to the upper end of the outer shell, the lower end of the liner being provided with a thickened rim which is free of the shell but fits closely therein, the restricted passage being constituted by a narrow annular clearance between the rim and the shell.